United States Patent [19]

Forney

[11] Patent Number: 4,737,373

[45] Date of Patent: Apr. 12, 1988

[54] COOKING AND BROWNING SYSTEM

[76] Inventor: Robert B. Forney, 1850 Vistazo West, Tiburon, Calif. 94920

[21] Appl. No.: 13,457

[22] Filed: Feb. 11, 1987

[51] Int. Cl.⁴ .............................................. A23L 1/01
[52] U.S. Cl. .................................... 426/510; 426/523; 99/355; 99/443 R; 99/361
[58] Field of Search ................. 99/330, 355, 361, 362, 99/443 R, 443 C; 126/15 A, 20, 21 A, 369; 426/523, 510, 509, 466, 646, 641, 383

[56] References Cited

U.S. PATENT DOCUMENTS

| | | | |
|---|---|---|---|
| 1,737,075 | 11/1929 | Brandt | 126/369 |
| 3,026,043 | 3/1962 | Lacy et al. | 126/20 X |
| 3,884,213 | 5/1975 | Smith | 99/348 X |
| 4,089,260 | 5/1978 | Brown et al. | 99/355 X |
| 4,306,857 | 12/1981 | Hofstetter | 99/362 X |
| 4,655,192 | 4/1987 | Jovanovic | 126/20 |

*Primary Examiner*—John M. Jillions
*Attorney, Agent, or Firm*—Thomas M. Freiburger

[57] ABSTRACT

A cooking and browning system and method for chicken, turkey, roasts or meat patties includes a first slow cooking step wherein the food products are cooked slowly at about 160° F. to 220° F. in a high humidity or steam environment, in a continuous movement. Next, the food products are put through a browner wherein, for a relatively short period of time, the products are subjected to high velocity, high temperature air which browns the outside of the product. The hot air in the browner is not recirculated but is exhausted to a heat exchanger/boiler, where heat is exchanged with water to produce steam which goes to the slow cooker, for the cooking of the products in the slow cook step.

16 Claims, 4 Drawing Sheets

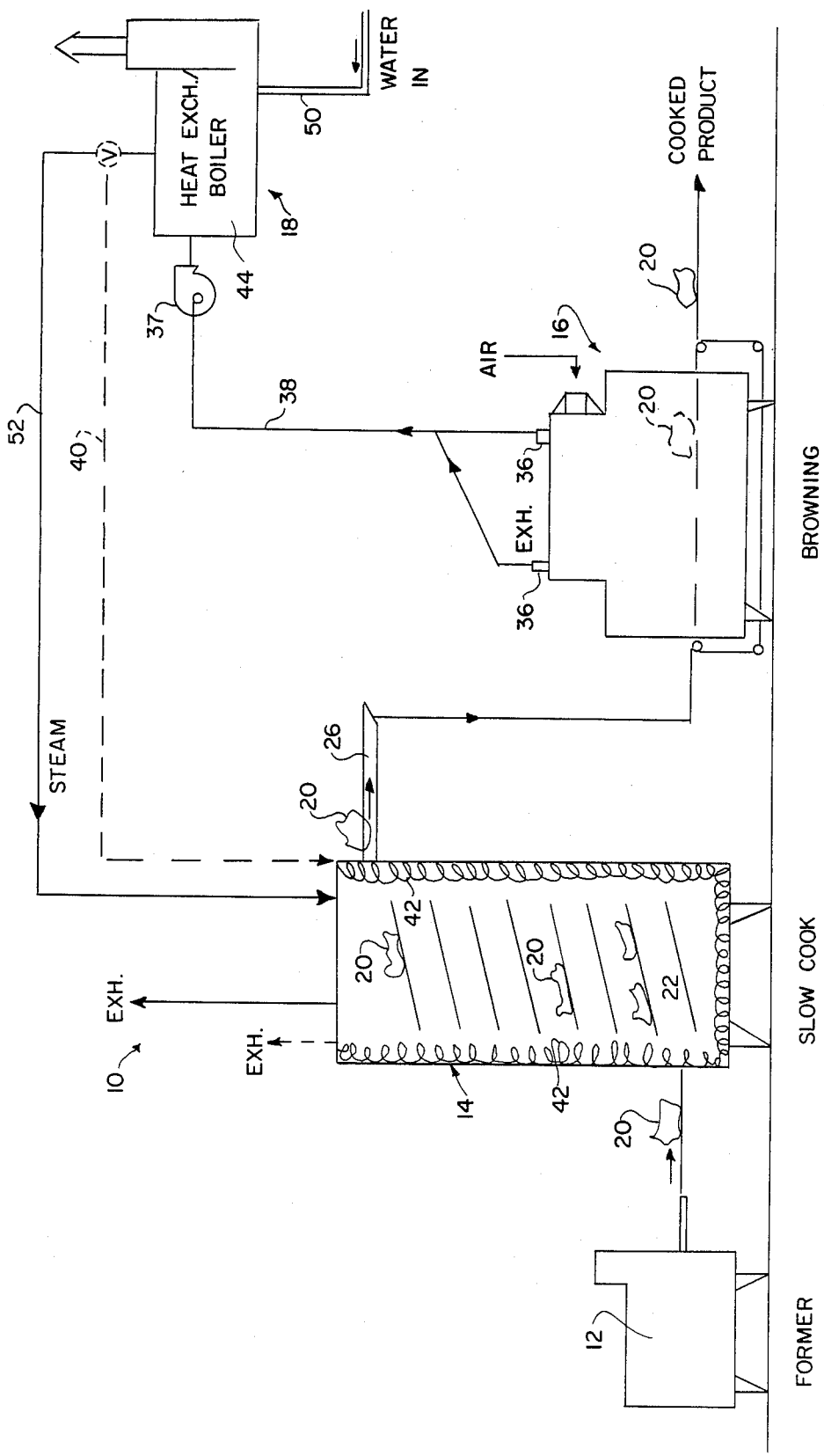

COOKING AND BROWNING SYSTEM

BACKGROUND OF THE INVENTION

The invention relates to cooking processes, and more particularly to a system and method for slow cooking and then browning products such as meat, roasts or patties.

There have been disclosed a number of different systems for cooking food products, particularly on a continuous feed basis. These have included systems which cook and brown in the same oven atmosphere and systems wherein cooking and browning are performed separately. It has been known to cook a food product in one step, and brown the product in a separate step, as in cosmetic browning simulating grill marks disclosed in U.S. Pat. No. 4,089,260.

U.S. Pat. No. 3,884,213 disclosed a cooking system involving high temperature air impingement on a meat product in order to effect browning. The air, on striking the product, rendered some of the fats and oils of the product into tiny droplets which were then carried by the air. The air was recirculated so as not to require continuous heating of fresh air up to the high browning temperature, and thus a recirculating mass of air carrying a high content of fat droplets was continuously recirculated through the browning environment.

A serious problem with such systems as just described, especially when used with meat products, was that they were continuously depositing the fat droplets on the walls and other surfaces of the cooking oven. These surfaces were required to be cleaned of such deposits daily (or every eight hours) and were extremely difficult to remove, having been cooked into shellac-like form onto the oven surfaces. The cleaning problems were so severe as to make such systems not economical.

It is an object of the present invention to overcome the problems of prior art cooking systems.

SUMMARY OF THE INVENTION

In the present invention a cooking and browning system for chicken, turkeys, roasts, patties and other similar food products includes a slow cooker and a separate, high temperature browner. Heat from the high temperature browner, contained in air which is impinged at high velocity against the food products, is exhausted from the browner with the air and is reclaimed for use in providing heat to the slow cooker. Recirculation and deposition of the deleterious fat droplets through the cooking and/or browning system is thereby avoided.

The system of the invention includes a first slow cooking step wherein the food products are cooked slowly at about 160° F. to 220° in a high humidity or steam environment, in a continuous movement such as on a straight or spiral conveyor. Exiting the slow cooker the products are substantially fully cooked.

Next, the food products are put through a browner, wherein, for a relatively short period of time, the products are subjected to high velocity, high temperature air which browns the outside of the product but only slightly further cooks the product. The browning is factored into the process so that it does not result in overcooking of the product. This depends on the mass and shape of the product.

The hot air in the browner is not recirculated but is exhausted to a heat exchanger/boiler, where heat is exchanged with water to produce steam which goes to the slow cooker, for the cooking of the products on the conveyor system.

The browning oven in accordance with the invention has hot air jets or nozzles which are so configured as to brown even irregularly shaped food products such as roasts, chickens or turkeys on substantially all sides as the food product moves through the browning oven.

It is therefore among the objects of the invention to avoid the problems of previous high velocity, high temperature cooking and browning ovens wherein heat is conserved by recirculation, and to provide a much cleaner browning process while still recycling heat in an efficient manner as steam for re-use in the system. These and other objects, advantages, features and characteristics of the invention will be apparent from the following description of a preferred embodiment, considered along with the accompanying drawings.

DESCRIPTION OF THE DRAWINGS

FIG. 1 is a system schematic view showing generally the components and flow of product in a cooking and browning system and method in accordance with the invention.

DESCRIPTION OF PREFERRED EMBODIMENT

Figure 3:
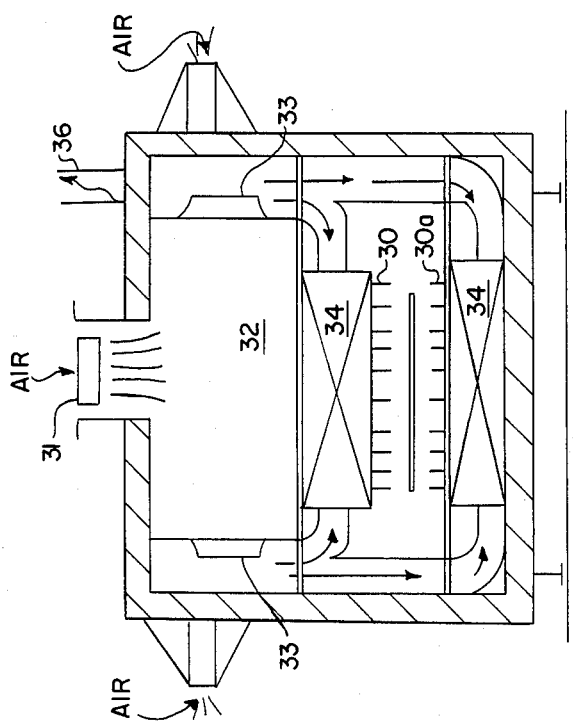
FIG. 3 is a transverse cross sectional view of the oven of FIG. 2.

In the drawings, FIG. 1 shows a cooking and browning system generally identified as 10 for cooking and browning food products which may be uniform or irregular in shape. The system 10 includes an input processor 12 for the food products; a conveyor/slow cooking oven 14 or similar continuous-movement, relatively long dwell time conveyor for carrying food products through an environment; a browning oven 16; and a heat exchanger/boiler assembly 18. The spiral conveyor/oven 14 is enclosed and serves to slowly cook the food products, having an interior temperature which may be in the range of about 106° F. to 225° F. The environment in the slow cooking oven preferably is of a very high humidity, and may include steam. As is well known, such a high humidity environment helps conduct heat to the food products for cooking.

FIG. 1 indicates a spiral conveyor in the slow cooker 14. The conveyor and the specific configuration of the slow cooking oven can take other forms as desired, the important feature being continuous movement through the slow cooker. The advantage of a relatively tall spiral conveyor as indicated is a minimization of required floor space.

The input processor 12 for the food products may comprise a patty maker, for example, in the case of food products in the form of patties, or it can be a preliminary basting or seasoning station in the case of whole chicken, turkey, or roasts as the food products.

FIG. 1 shows the food products 20 leaving the input processing station 12 and entering the slow cooking oven/spiral conveyor 14. In the oven 14, they are conveyed on an endless belt 22 which may be in a spiral path as in the cylindrical spiral conveyor shown. The conveyor may be any of a variety of known types for the purpose, and may comprise, for example, a twin carousel conveyor as shown in U.S. Pat. No. 4,448,301.

The food products are shown exiting the oven 14 and being transferred to another conveyor indicated at 26. This conveyor carries the food products, now approaching the fully cooked state, to the browning oven 16.

Figure 2:
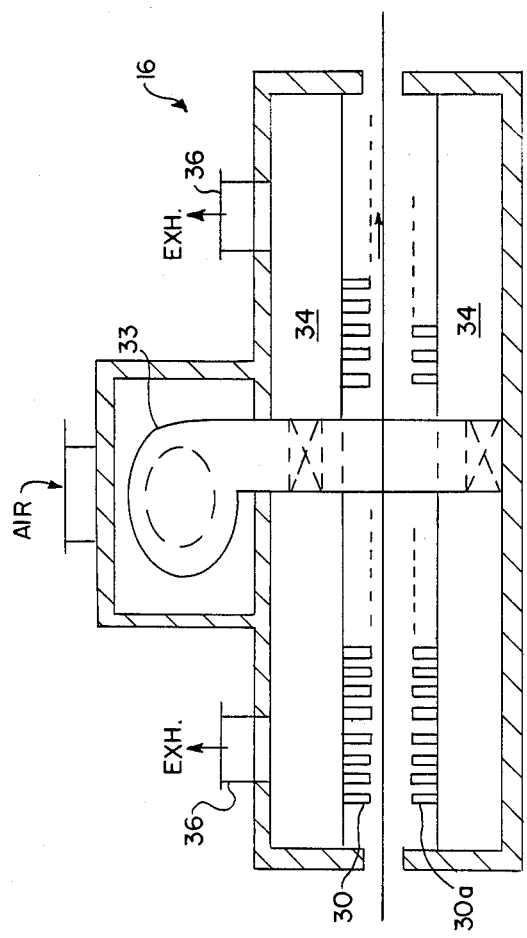
FIG. 2 is a longitudinal cross sectional view showing a preferred configuration of a high velocity hot air impingement browning oven in the system of the invention.
Figure 4:
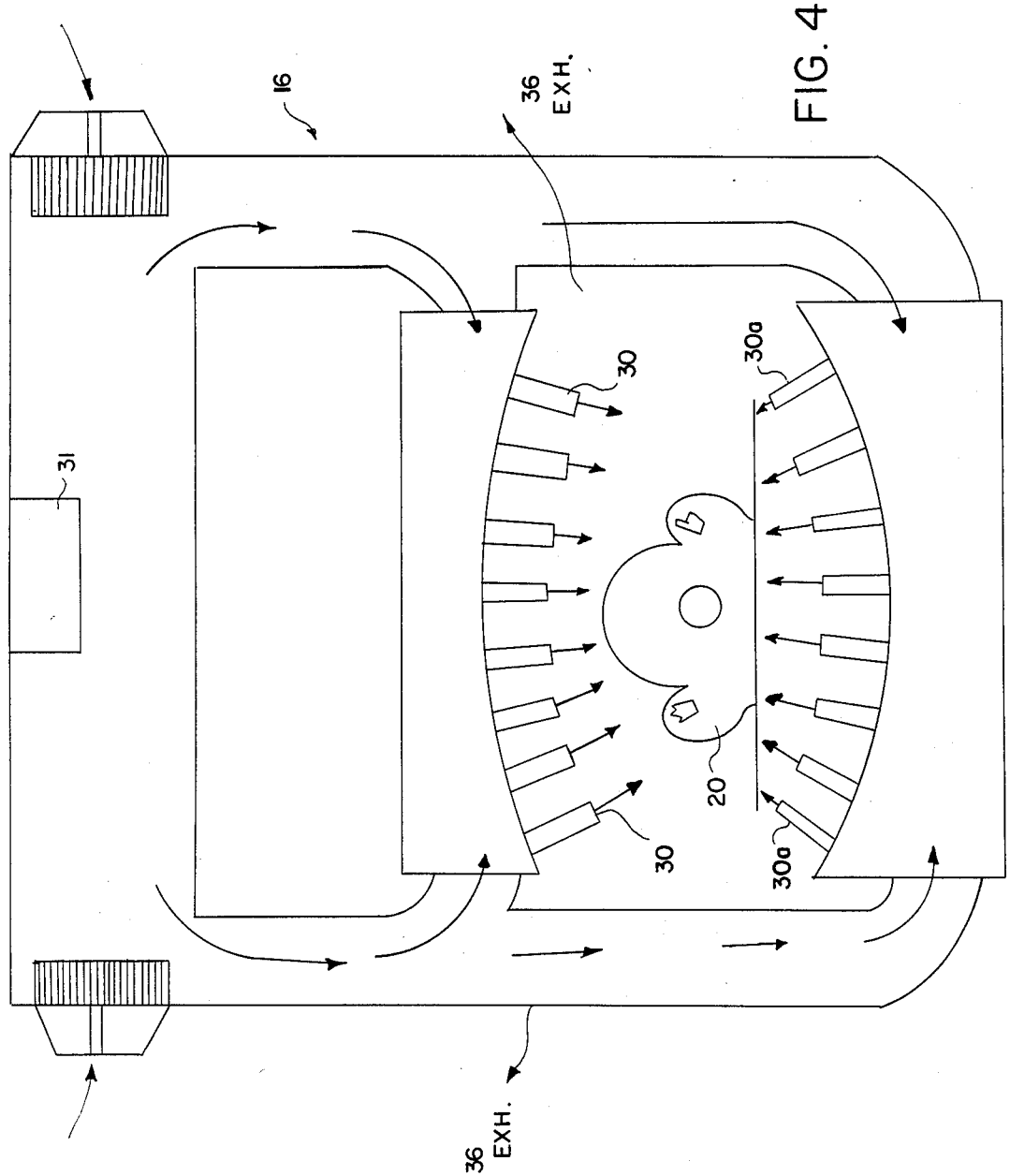
FIG. 4 is a sectional view similar to FIG. 3, but showing a somewhat modified construction.

FIGS. 2, and 4 show preferred configurations of the browning oven 16. The food products enter from the left as seen in FIG. 2 and encounter a series of hot air jets or nozzles 30, which preferably are positioned substantially all around the path of the food product as shown in FIG. 4 so as to impinge high temperature air at high velocity against substantially all sides of the products. This produces a substantially even browning of all surfaces of the food product, even an unevenly shaped roast or turkey 20 as illustrated in FIG. 4. Some nozzles 30a may be disposed underneath the conveyor on which the food products are carried, so as to penetrate through the conveyor (which may be of stainless steel links) and brown the bottom surface of the food products 20.

The food products are quickly browned in the browning oven 16 but not overcooked. The browning is accomplished in a relatively short period of time (e.g., about 15 seconds to one minute depending on the product) and is accomplished by high velocity hot air striking the surface and then exhausting to the steam heat exchanger.

The browning oven 16, as shown in FIGS. 2, 3 and 4, may include a gas burner 31 which injects hot gasses and air into a combustion chamber 32. Additional fresh air is forced in by fans 33 and heated, so that hot air (and gases) sent from the combustion chamber to upper and lower plenums 34 is at a high pressure. When the high-pressure, high-temperature air exits through the nozzles 30 and 30a, it is at high velocity, preferably 10,000 to 20,000 (preferably about 15,000) feet per minute, and at a temperature of about 750° F. to about 1000° F.

The nozzles 30 and 30a may be arranged to "profile" the particular food item being browned, as shown with the turkey or roast 20 in FIG. 4, with the nozzles positioned in a curving arrangement around the roast 20.

When the food products 20 leave the browning oven 16, they are removed from the conveyor 30 and exit the system 10. As an important feature of the present invention, the hot air, after impinging on the food products in the browning oven 16, is not recycled again through the browning oven as was typical in prior hot air oven and cooking systems. Instead, the hot air, now laden with some rendered fat droplets from the products 20, is exhausted from the browning oven 16 through exhaust outlets 36, pulled by a fan or blower 37. New fresh air is brought into the browning oven, heated by the burner 31 and fed to the plenums 34 and through the nozzles 30 and 30a to brown the food products.

The hot exhaust air from the browner 16 is pulled by the fan 37 and fed via a conduit 38 shown in FIG. 1 to the heat exchanger/boiler 18, where it is used to make steam for use in the slow cooker/spiral conveyor 14.

Also, as shown in dashed lines in FIG. 1, a portion of the steam may be fed through a branch conduit 40 to the slow cooker 14, where it helps maintain temperature in the slow cooker by dry heat radiation. This portion of the steam is contained in heat exchanger tubes 42 within the slow cooking oven 14.

Figure 5:
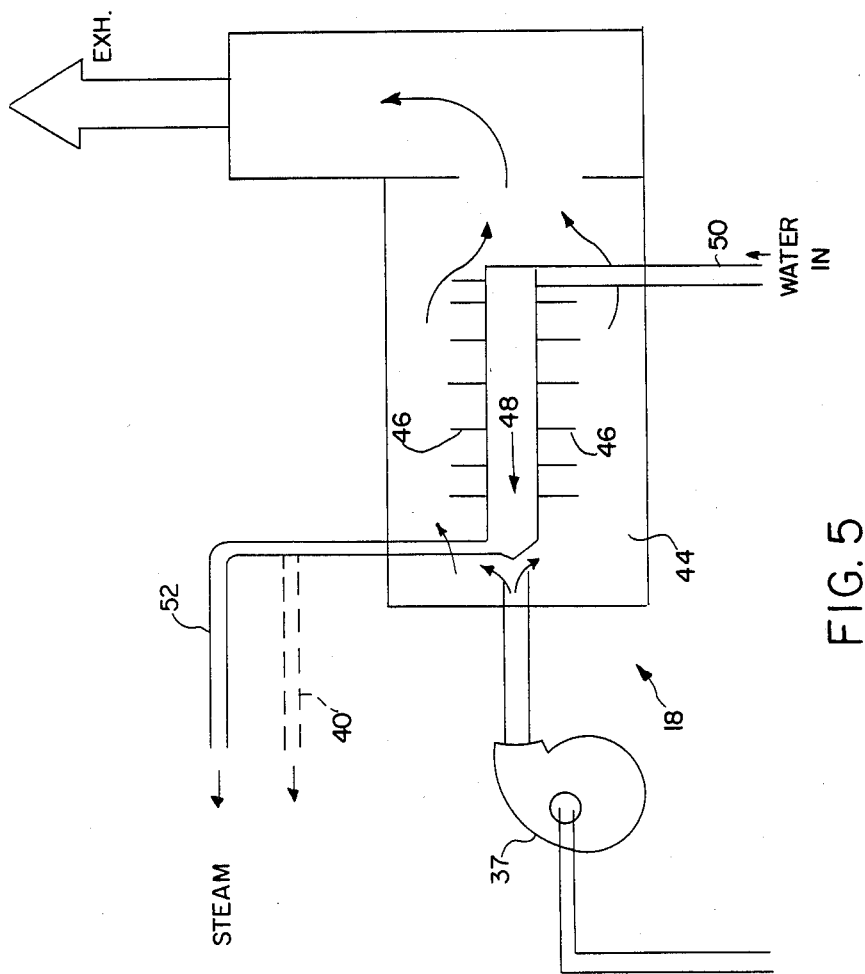
FIG. 5 is a view showing a heat exchanger which forms a component of the system of the invention. The heat exchanger receives hot exhaust air from the browning oven and reuses most of its heat for heating a throughput of water to produce steam for delivery to the slow cooker.

The heat exchanger/boiler 18 may comprise a counterflow heat exchanger as indicated in FIG. 5, with the hot exhaust air (which may be at about 600° F. to 700° F.) caused to flow through a plenum space 44 where it encounters fins 46 and gives up heat to the fins. The fins are connected to a boiler tube 48 which receives water from a water input line 50. The water is boiled in the boiler tube 48 and turned into steam, which flows at relatively low pressure of about 5 to 15 psig through a steam conduit 52 into the interior of the slow cooker 14 to provide the heat and humidity for the slow cooking process.

As mentioned above, the temperature in the slow cooker preferably is in a range of about 160° F. to 225° F., but most preferably the temperature is at or above 212° F., maintained by the steam and also by the heat exchanger coil 42 inside the slow cooker 14, which keeps the temperature up and tends to minimize condensation of the steam in the slow cooker.

By the method and system of the invention, energy is conserved by reclaiming much of the heat from the hot air exhausted from the high temperature browner 16. The counterflow heat exchanger/boiler 18 recaptures approximately 70 percent to 80 percent of the heat energy of the hot exhaust air, and can supply 100% of the heat requirements for the large-volume slow cooker 14.

The above described preferred embodiment illustrates the principles of the invention but is not intended to limit the scope of the invention. Other embodiments and variations to this preferred embodiment will be apparent to those skilled in the art and may be made without departing from the invention as defined in the following claims.

I claim:

1. A cooking and browning system for meat and meat-like food products, comprising:
    slow cooking means for slow cooking of the food products in a temperature-controlled environment in the range of about 160° F. to 225° F.,
    conveyor means within the slow cooker means for transporting the food products through the slow cooker means in a continuous movement,
    browning means for browning the outside surfaces of the food products with high-temperature, high-velocity air,
    means for exhausting the high-temperature air from the browning means,
    heat exchanger/boiler means for taking the exhaust air from the browning means and using the heat of the exhaust air to boil input water to make steam, including conduit means for directing the hot exhaust air from the browning means to the heat exchanger/boiler means, and
    a steam conduit connected to the heat exchanger/boiler means and to the interior of the slow cooking means, for delivering steam to the slow cooking means for the slow cooking of the food products.

2. The system of claim 1, further including radiant heating means for taking a portion of the steam from the heat exchange/boiler means and delivering it to help heat the interior of the slow cooking means while isolating it from the food products in the slow cooking means.

3. The system of claim 2, including a heat exchanger coil within the slow cooking means, connected to receive a portion of the steam to provide radiant heat for the slow cooking means.

4. The system of claim 1, wherein the slow cooking means comprises an enclosure and a conveyor system within the enclosure, for receiving the food products as an input and transporting them in a continuous movement through the enclosure to an outlet end.

5. The system of claim 1, further including an input processor for the food products, upstream of the slow cooking means.

6. The system of claim 5, wherein the input processor includes patty-forming means, for producing meat patties for cooking and browning in the system.

7. The system of claim 1, wherein the heat exchanger/boiler means comprises a counterflow heat exchanger including a plenum enclosure receiving the browning oven exhaust through the conduit means, heat exchange fins within the plenum enclosure, and a boiler inside the plenum and connected in heat transfer relation to the fins, the boiler having means for receiving input water and an outlet for exhausting steam, and being arranged in counterflow heat exchange relationship with the flow of the cooking oven exhaust.

8. The system of claim 1, wherein the browning means comprises a high-velocity, high-temperature air browning oven including a plurality of hot air nozzles positioned around the path of the food products so as to brown the food products on substantially all sides, regardless of irregularity of shape of the food products.

9. The system of claim 1, wherein the browning means includes means for delivering jets of air against the food products at about 10,000 to 20,000 FPM and about 750° to 1000° F.

10. A method for cooking and browning meat and other fat-containing food products, comprising the steps of:
    moving the food products into a slow cooker,
    performing a slow cook on the food products within the slow cooker, while moving the food products in a continuous motion through the slow cooker, the slow cooker having a high-humidity atmosphere and a temperature such as to slowly cook the food products,
    conveying the cooked food products in a continuous movement from the slow cooker to a browning oven,
    impinging high-temperature, high-velocity air against the food products in the browning oven for a relatively short period of time, so as to brown the exterior of the food products,
    conveying the cooked and browned food products to an exit station downstream of the browning oven,
    exhausting hot air from the browning oven after it has been directed at the food products, and using fresh makeup air, heated and accelerated to high velocity, for the browning of the food products,
    conducting the exhausted hot air from the browning oven to a heat exchanger/boiler,
    conducting water through the heat exchanger/boiler so as to pick up heat from the hot exhaust air and to produce steam by boiling the water with the heat of the hot exhaust air,
    exhausting the hot exhaust air after it has exchanged heat with the water, and
    conducting the steam produced in the heat exchanger/boiler to the interior of the slow cooker so as to supply heat for the cooking of the food products in the slow cooker.

11. The method according to claim 10, wherein the browning step includes impinging the hot air against the food products from a plurality of different directions, so as to brown substantially the entire exterior of the food products.

12. The method according to claim 10, further including conducting a portion of the steam from the heat exchanger/boiler to the slow cooker to conduct heat into the atmosphere of the slow cooker, without introducing said portion of the steam directly into the atmosphere of the slow cooker.

13. The method according to claim 12, including conducting said portion of the steam through a heat exchanger coil on the inside of the slow cooker.

14. The method according to claim 10, wherein the heat exchanger/boiler is arranged so that the hot air exhaust air from the browning oven flows in counterflow heat exchange relationship with the water which is heated to produce steam.

15. The method according to claim 10, wherein the food products are cooked to the extent of approaching a full cook in the slow cooker, and wherein the cooking of the products is completed in the browning oven, without overcooking.

16. The method according to claim 10, wherein the air impinged against the food products in the browning oven is at about 10,000 to 20,000 FPM and about 750° to 1000° F.

* * * * *